US009715141B2

(12) United States Patent
Li

(10) Patent No.: US 9,715,141 B2
(45) Date of Patent: Jul. 25, 2017

(54) BACKLIGHT MODULE FOR LIQUID CRYSTAL DISPLAY

(71) Applicant: Suzhou Crystalent Co., Ltd., Suzhou (CM)

(72) Inventor: Tong Li, Suzhou (CN)

(73) Assignee: SUZHOU CRYSTALENT CO., LTD., Suzhou (CN)

( * ) Notice: Subject to any disclaimer, the term of this patent is extended or adjusted under 35 U.S.C. 154(b) by 126 days.

(21) Appl. No.: 14/454,740

(22) Filed: Aug. 8, 2014

(65) Prior Publication Data
US 2014/0347602 A1 Nov. 27, 2014

Related U.S. Application Data

(63) Continuation-in-part of application No. PCT/CN2012/001733, filed on Dec. 26, 2012.

(30) Foreign Application Priority Data

Feb. 8, 2012 (CN) .......................... 2012 1 0026819

(51) Int. Cl.
*G02F 1/1335* (2006.01)
*F21V 8/00* (2006.01)
*G02B 5/04* (2006.01)
*G02B 5/08* (2006.01)

(52) U.S. Cl.
CPC ..... *G02F 1/133615* (2013.01); *G02B 6/0046* (2013.01); *G02B 6/0053* (2013.01); *G02B 5/045* (2013.01); *G02B 5/0808* (2013.01); *G02B 6/0055* (2013.01); *G02B 6/0063* (2013.01); *G02F 2001/133607* (2013.01); *G02F 2001/133616* (2013.01)

(58) Field of Classification Search
CPC ... G02F 1/133615; G02F 2001/133616; G02F 2001/133607; G02B 6/0046; G02B 6/0053; G02B 6/0055; G02B 6/0063; G02B 5/045
See application file for complete search history.

(56) References Cited

U.S. PATENT DOCUMENTS

| 2002/0176036 | A1* | 11/2002 | Kaneko | G02F 1/133615 349/65 |
| 2006/0268418 | A1* | 11/2006 | Kim | G02B 6/0053 359/618 |
| 2007/0222916 | A1* | 9/2007 | Kohara | G02B 5/045 349/65 |

* cited by examiner

*Primary Examiner* — Jessica M Merlin
(74) *Attorney, Agent, or Firm* — Matthias Scholl, PC; Matthias Scholl

(57) ABSTRACT

A backlight module for a liquid crystal display including a light source, a triangular wedge for generating parallel beams, a reflecting device, and a deflection-collimating device, all of which are disposed in front of a liquid crystal display in sequence. The triangular wedge includes a first incident surface, a first emergent surface, and a second emergent surface. The included angle formed between the first emergent surface and the second emergent surface is 5°. The first incident surface is opposite to the light source. The reflecting device is disposed at one side of the first emergent surface to reflect the light rays from the first emergent surface back to the triangular wedge. The deflection-collimating device is disposed between the second emergent surface and the liquid crystal display to refract parallel beams from the second emergent surface to generate light rays vertical to the plane of the liquid crystal display.

19 Claims, 7 Drawing Sheets

Reflectivity

Incident angle

BACKLIGHT MODULE FOR LIQUID CRYSTAL DISPLAY

CROSS-REFERENCE TO RELATED APPLICATIONS

This application is a continuation-in-part of International Patent Application No. PCT/CN2012/001733 with an international filing date of Dec. 26, 2012, designating the United States, now pending, and further claims priority benefits to Chinese Patent Application No. 201210026819.6 filed Feb. 8, 2012. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a backlight module for a liquid crystal display.

Description of the Related Art

Liquid crystal in a panel of LCDs utilizes a backlight module to provide a light source. The backlight source generally employs a light emitting diode (LED) or a cold cathode fluorescent source (CCFL) as the light source. However, the divergence angle of the light source is relatively large, and thus the energy utilization rate is generally less than 10%. Thus, the light emitted by the backlight module requires to be collimated.

FIG. 1 shows a backlight module capable of producing a collimated light. The backlight module includes: a light guide plate 10, a prism sheet 12, and a diffusion sheet 14. Light enters the light guide plate 10 via an incident plane 100. A part of the light directly emerges from the emergent plane 102, another part of the light emerges from a bottom plane 104, and the majority of the light is reflected one or several times inside the light guide plate 100 and is eventually ejected out of the light guide plate 10 via the emergent plane 102. The light ejected from the emergent plane 102 of the light guide plate 10 enters the prism sheet 12 via a prism plane 122, and a transmission direction of a majority of the light is changed by a plurality of prism structures disposed on the prism plane 122 and the light is then ejected in a direction of a normal line of a top plane 124, and travels to the diffusion sheet 14.

Although the backlight module is capable of providing collimated light, the divergence angle of the collimated light is too large and it is difficult to effectively decrease the angle. When the size of the reflection structure 128 is relatively large, the divergence angle of the reflected light is relatively large, and therefore, in order to decrease the divergence angle of the emergent light and to improve the collimation of the emergent light, the reflection structure 128 must be precisely manufactured, thereby increasing the difficulty and the production cost of the manufacturing process.

FIG. 2 shows a compact collimating reflection sheet (CCR) capable of producing a parallel beam. The CCR is disposed at bottom of the backlight module, and the whole structure has a ship-like shape. The light source is disposed at two ends of the collimation reflection sheet. The CCR includes an incident plane, which is also a reflective plane and has a zigzag structure. Each zigzag element has different angle and gradient. The light of different angle sent out by the light source is reflected by the zigzag structures having different angles and different gradients, and the transmission of the light is changed to eject the light perpendicularly to the liquid crystal screen.

Although the structure depicted in FIG. 2 is capable of producing a collimated beam, the light emitted from the light source is continuous and has a large angle and the reflection sheet of the collimated beam is in a continuous zigzag structure. Thus, the collimation effect of the produced collimated beam is not ideal. Meanwhile, the discontinuous zigzag structure is finely designed, and each zigzag has a specific angle and gradient, so that the processing difficulty is very large and the production cost is relatively high.

SUMMARY OF THE INVENTION

In view of the above-described problems, it is one objective of the invention to provide a backlight module that features high collimation of emergent rays and high light utilization rate.

To achieve the above objective, in accordance with one embodiment of the invention, there is provided a backlight module for a liquid crystal display (LCD). The backlight module comprises a light source, a triangular wedge for generating parallel beams, a reflecting device, and a deflection-collimating device, all of which are disposed in front of a liquid crystal display in sequence.

The triangular wedge comprises a first incident surface, a first emergent surface, and a second emergent surface. An included angle formed between the first emergent surface and the second emergent surface is less than or equal to 5°. The first incident surface is opposite to the light source. The reflecting device is disposed at one side of the first emergent surface to reflect the light rays from the first emergent surface back to the triangular wedge. The deflection-collimating device is disposed between the second emergent surface and the liquid crystal display to refract parallel beams from the second emergent surface to generate light rays vertical to a plane of the liquid crystal display.

In a class of this embodiment, the deflection-collimating device comprises a deflection prism assembly and a collimating prism. The deflection prism assembly comprises a plurality of parallelogram prisms arraying in the shape of a parallelogram in one dimensional direction; an acute angle of the parallelogram is more than or equal to 45°. The parallelogram prisms comprise a second incident surface and a third emergent surface. The second incident surface is parallel to the second emergent surface. The acute angle of the parallelogram at the side of the second incident surface is directed to the first incident surface, and an obtuse angle of the parallelogram is directed to a crosspoint of the first emergent surface and the second emergent surface. The collimating prism comprises a third incident surface and a fourth emergent surface. The third incident surface is parallel to the third emergent surface. The fourth emergent surface comprises a plurality of sawteeth in series which are asymmetric in one dimensional direction. An included angle formed between an inclined plane of the sawteeth and the third incident surface is less than or equal to 10°.

In a class of this embodiment, the deflection prism assembly and the collimating prism are integrated to generate a deflection-collimating prism. The third incident surface is coincident with the third emergent surface.

In a class of this embodiment, the deflection-collimating device comprises a deflection prism assembly and the collimating prism. The deflection prism assembly comprises a plurality of parallelogram prisms arraying in the shape of a parallelogram in one dimensional direction; an acute angle of the parallelogram is more than or equal to 45°. The parallelogram prisms comprise a second incident surface and a third emergent surface. The second incident surface is parallel to the second emergent surface. The acute angle of the parallelogram at the side of the second incident surface is directed to the first incident surface, and an obtuse angle of the parallelogram is directed to a crosspoint of the first emergent surface and the second emergent surface. The collimating prism comprises a third incident surface and a fifth emergent surface. The third incident surface is parallel to the third emergent surface. The fifth emergent surface is parallel to a plane of the liquid crystal display. An included angle formed between the third incident surface and the fifth emergent surface is less than or equal to 10°.

In a class of this embodiment, the deflection prism assembly and the collimating prism are integrated to generate a prism wedge. The third incident surface is coincident with the third emergent surface.

In a class of this embodiment, the reflecting device is a reflecting sheet made of optical material; the reflecting sheet comprises a metal or medium-plated reflecting surface. The reflecting surface is parallel to the first emergent surface.

In a class of this embodiment, the triangular wedge is a wedge sheet made of optical materials.

In a class of this embodiment, the parallelogram prisms are parallelogram prism sheets made of optical material, and the collimating prisms are collimating prism sheets made of optical material.

In a class of this embodiment, the deflection-collimating prism is a deflection-collimating prism sheet made of optical material.

In a class of this embodiment, the prism wedge is a prism wedge sheet made of optical material.

Advantages in accordance with embodiments of the invention are summarized as follows. The components of the backlight module have simple structures, uncomplicated manufacturing process, and low production costs. The resulting parallel beams have good collimation, thereby improving the light utilization rate and solving the defects of conventional LCDs such as light leakage, color cast, and low contrast degree.

BRIEF DESCRIPTION OF THE DRAWINGS

The invention is described hereinbelow with reference to accompanying drawings, in which.

DETAILED DESCRIPTION OF THE EMBODIMENTS

For further illustrating the invention, experiments detailing a backlight module for a liquid crystal display are described below. It should be noted that the following examples are intended to describe and not to limit the invention.

EXAMPLE 1

Figure 1:
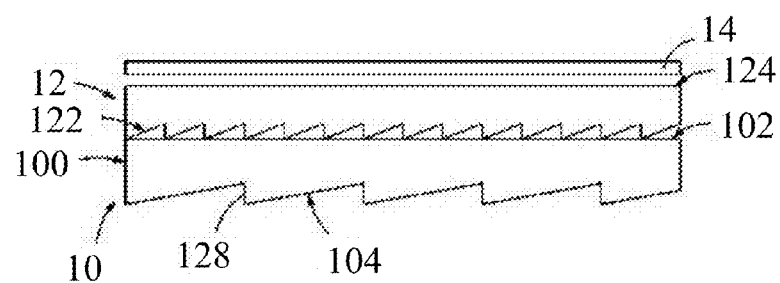
FIG. 1 is a sectional view of a conventional backlight module.
Figure 2:
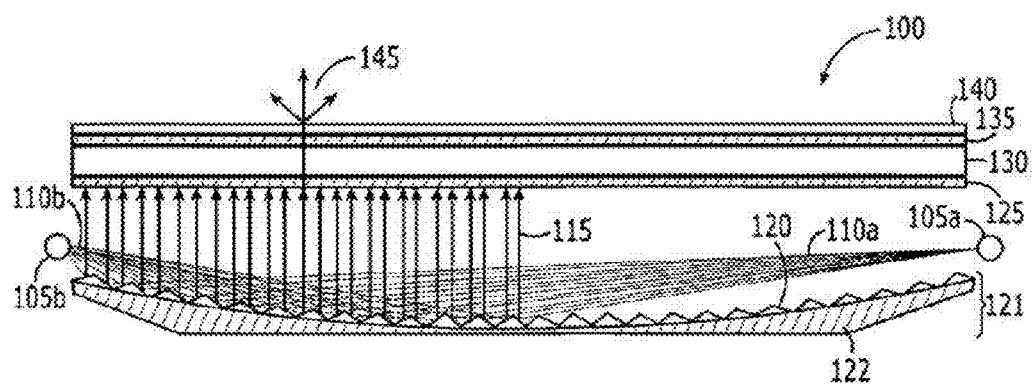
FIG. 2 is a sectional view of another conventional backlight module.
Figure 3:
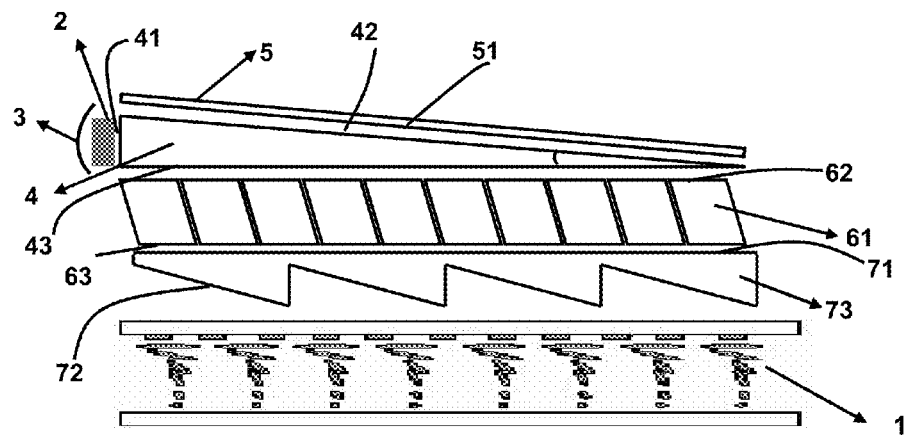
FIG. 3 is a schematic diagram of a backlight module in Example 1 of the invention.

As shown in FIG. 3, the disclosure of the invention provides a backlight module for a liquid crystal display (LCD) comprising an LED light source 2, a light reflector 3, a wedge sheet 4 for generating parallel beam, a reflecting sheet 5, a deflection prism sheet assembly 6, and a collimating prism sheet 7, all of which are disposed in front of a liquid crystal display 1 in sequence. The wedge sheet 4, the reflecting sheet 5, the deflection prism sheet assembly 6, and the collimating prism sheet 7 are all made of optical materials. The wedge sheet 4 comprises a first incident surface 41, a first emergent surface 42, and a second emergent surface 43. An included angle formed between the first emergent surface 42 and the second emergent surface 43 is 5°. The first incident surface 41 is opposite to the light source 2. The reflecting sheet 5 is disposed at one side of the first emergent surface 42. The reflecting sheet 5 comprises a metal-plated reflecting surface 51. The reflecting surface 51 is parallel to the first emergent surface 42 and reflects the light rays from the first emergent surface 42 back to the wedge sheet 4. The deflection prism sheet assembly 6 and the collimating prism sheet 7 are disposed in sequence between the second emergent surface 43 and the liquid crystal display 1 and form a deflection-collimating device which refract the parallel beam from the second emergent surface 43 to generate light rays vertical to the surface of the liquid crystal display 1. The deflection prism sheet assembly 6 comprises a plurality of parallelogram prism sheets 61 arraying in the shape of a parallelogram in one dimensional direction. The acute angle α of the parallelogram is 65°. The parallelogram prism sheets 61 comprise a second incident surface 62 and a third emergent surface 63. The second incident surface 62 is parallel to the second emergent surface 43. The acute angle α of the parallelogram at the side of the second incident surface 62 is directed to the first incident surface 41, while the obtuse angle β of the parallelogram is directed to a crosspoint of the first emergent surface 42 and the second emergent surface 43. The collimating prism sheet 7 comprises a third incident surface 71 and a fourth emergent surface 72. The third incident surface 71 is parallel to the third emergent surface 63. The fourth emergent surface 72 comprises a plurality of sawteeth 73 in series which are asymmetric in one dimensional direction. The included angle γ formed between the inclined plane of the sawteeth 73 and the third incident surface 71 is 10°.

Figure 4:
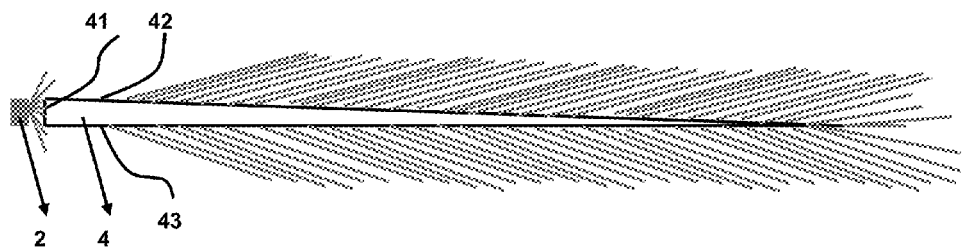
FIG. 4 shows a working principle of a wedge sheet of a backlight module in accordance with one embodiment of the invention.

FIG. 4 shows the working principle of the wedge sheet 4 which is the core component of the invention. Light rays emitted from the light source enter the wedge sheet 4 with different incident angles and are transmitted in the wedge sheet 4 on the basis of total reflection. When the incident angle in the medium is less than or equal to the critical angle of the total reflection, the light rays emerge from the second emergent surface 43 of the wedge sheet 4. The wedge sheet 4 is configured to converge the divergent lights from the light source 2 with large divergence angles by repeated total reflection to generate parallel beams which finally emerge out of the wedge sheet 4 with the incident angles being almost equal to the critical angle of the total reflection.

Figure 5A:
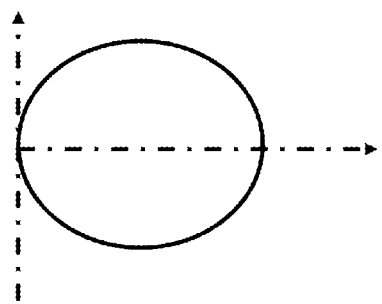
FIG. 5A shows a distribution of divergence angles of a light source in accordance with one embodiment of the invention.
Figure 5B:
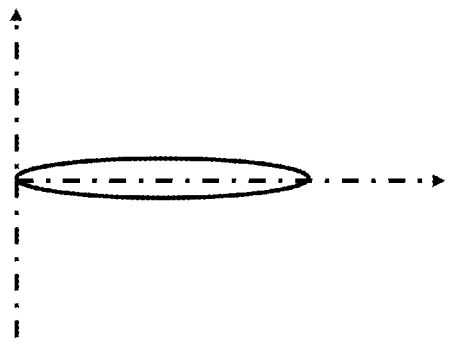
FIG. 5B shows a distribution of divergence angles of a light source after being treated by a wedge sheet in accordance with one embodiment of the invention.

FIGS. 5A and 5B show the divergence angles of the light rays before and after the treatment of the wedge sheet 4. Specifically, FIG. 5A shows the distribution of the divergence angles of the light rays emitted from the LED light source 2, and the divergence angles are almost ±60°. The light rays are converged by the wedge sheet 4 to generate parallel beams having divergence angles of almost ±15°, as shown in FIG. 5B.

Figure 6:
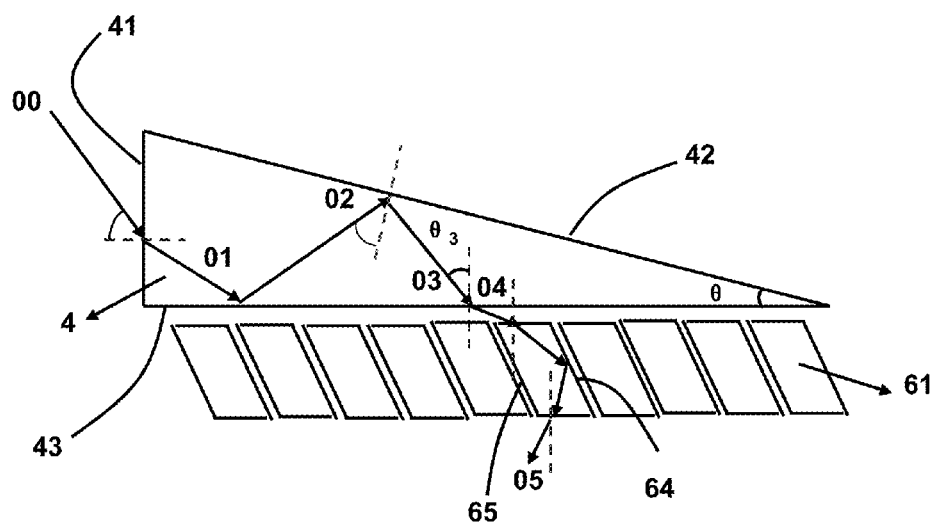
FIG. 6 shows an optical path of a light ray transmitted in a wedge sheet and parallelogram prism sheets in accordance with one embodiment of the invention.

FIG. 6 shows an optical path of a light ray transmitted in the wedge sheet 4 and the parallelogram prism sheets 61. The working principle of the wedge sheet 4 is based on the Snell's law of refraction:

$$n_1 \sin \theta_1 = n_2 \sin \theta_2$$

in which, $n_1$ represents the refractive index of a first medium, $\theta_1$ is an incident angle, $n_2$ represents the refractive index of a second medium, and $\theta_2$ is a refracted angle.

Figure 7:
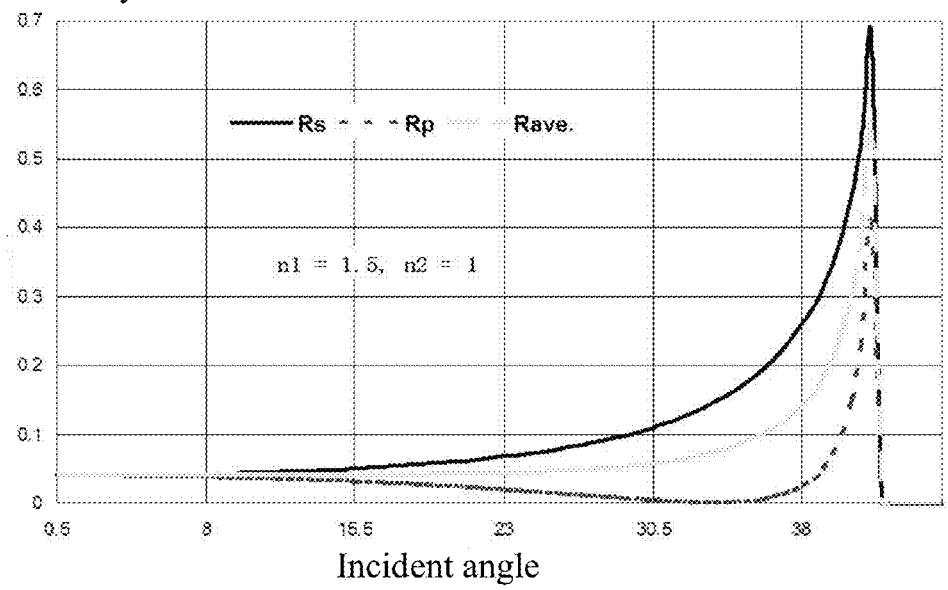
FIG. 7 shows a reflection curve of a light ray from an optically denser medium to an optically thinner medium based on the Snell's law of refraction.

The light ray 00 emitted from the light source 2 is refracted via the first incident surface 41 of the wedge sheet 4 to generate the refracted ray 01. The refracted ray 01 is totally reflected by the second emergent surface 43 of the wedge sheet 4 to generate the reflection ray 02. The reflection ray 02 is totally reflected by the first emergent surface 42 of the wedge sheet 4 to generate the reflection ray 03. FIG. 7 shows the reflection curve from an optically denser medium to an optically thinner medium based on the Snell's law of refraction. For example, assuming the refractive index of the medium is 1.5, the critical angle of the total reflection is about 42°. When the light ray 03 rays on the second emergent surface 43, and the included angle $\theta_3$ formed by the light ray 03 and the normal line is less than or equal to the critical angle of the total reflection, the light ray 03 is refracted by the second emergent surface 43 to generate the light ray 04.

The light ray 04 emitted from the second emergent surface 43 of the wedge sheet 4 is generated in the form of approximating to the critical angle of the total reflection, and thus has a large incident angle with the liquid crystal display 1, which cannot meet the utilization requirement. A deflection-collimating device is employed to reflect the light rays to be vertical to the liquid crystal display 1. As shown in FIG. 6, the reflection surface 64 of the parallelogram prism sheets 61 reflects the light ray 04 from the wedge sheet 4 to generate the light ray 05 which is approximately vertical to the third emergent surface 63 of the parallelogram prism sheets 61.

Figure 8:
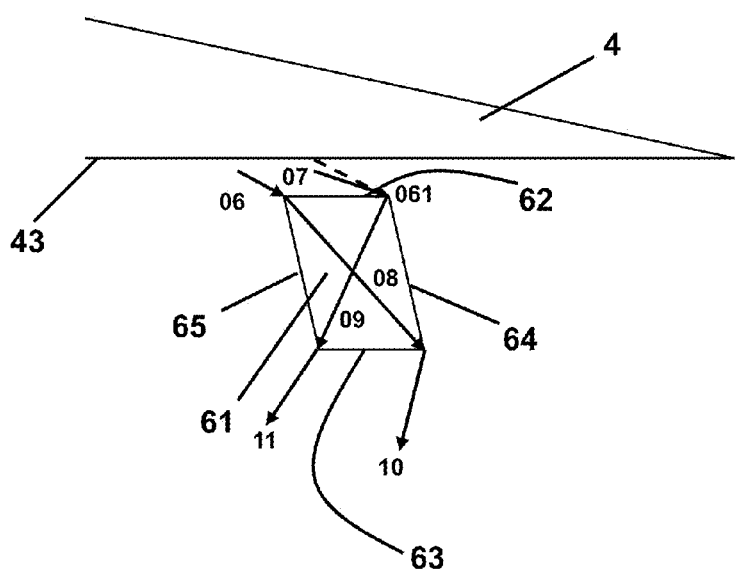
FIG. 8 shows a working diagram of a parallelogram prism sheet in accordance with Example 1 of the invention.

FIG. 8 shows an optical path of a single light ray transmitted in the wedge sheet 4 and the parallelogram prism sheets 61. In fact, the parallel beams emitted from the wedge sheet 4 have small divergence angles. As shown in FIG. 8, a light ray emitted from the second emergent surface 43 of the wedge sheet 4 rays on the second incident surface 62 of the parallelogram prism sheets 61. The light rays 06 and 07 are boundary rays of the light ray. The fictitious light ray 061 is parallel to the light ray 06, which shows that the light rays 06 and 07 are not parallel. To improve the utilization rate of light and avoid the energy loss, all the light rays emitted from the wedge sheet 4 and raying on the parallelogram prism sheets 61 should satisfy the following two conditions: 1) all the light rays in the parallelogram prism sheets 61 should be reflected by the reflection surface 64 of the parallelogram prism sheets 61; and 2) all the light rays reflected by the reflection surface 64 of the parallelogram prism sheets 61 should not ray on the other reflection surface 65 of the parallelogram prism sheets 61.

As shown in FIG. 8, two emergent rays 10 and 11 satisfying the above two conditions have certain deflections relative to the normal line of the third emergent surface 63 of the parallelogram prism sheets 61. Thus, the collimating prism sheet 7 is employed to refract the emergent rays along the normal line direction, that is, to ensure the emergent rays to be vertical to the liquid crystal display 1.

Figure 9:
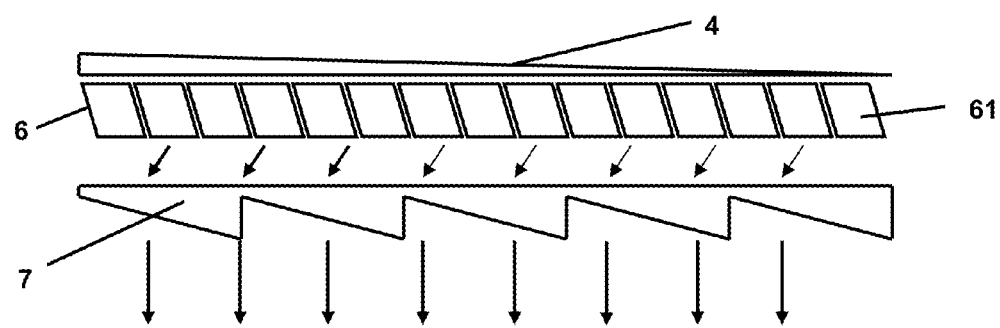
FIG. 9 shows a working diagram of a collimating prism sheet in accordance with Example 1 of the invention.

FIG. 9 shows the working diagram of the collimating prism sheet 7. The collimating prism sheet 7 is a transmission type prism. The role of the collimating prism sheet 7 is to refract the parallel beams from the parallelogram prism sheets 61 approximately vertical to the liquid crystal display 1 to be parallel beams vertical to the liquid crystal display 1.

Figure 11:
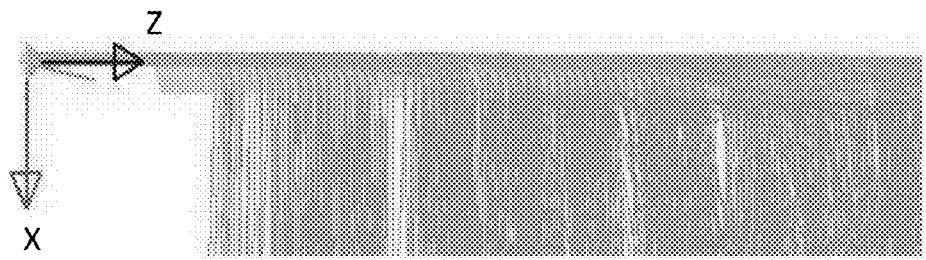
FIG. 11 is a software simulation diagram of emergent rays which is obtained by reflecting and refracting divergent lights of a light source using a backlight module of the invention.

FIG. 11 is a software simulation diagram of emergent rays which is obtained by reflecting and refracting the divergent light of the light source 2 with large divergence angles using the backlight module of the invention. As seen from the simulation results, the divergent light emitted from the light source 2 with large divergence angles is converted into parallel beams vertical to the liquid crystal display 1 after reflection and refraction by the wedge sheet 4, the reflecting sheet 5, the deflection prism sheet assembly 6, and the collimating prism sheet 7.

EXAMPLE 2

Figure 10:
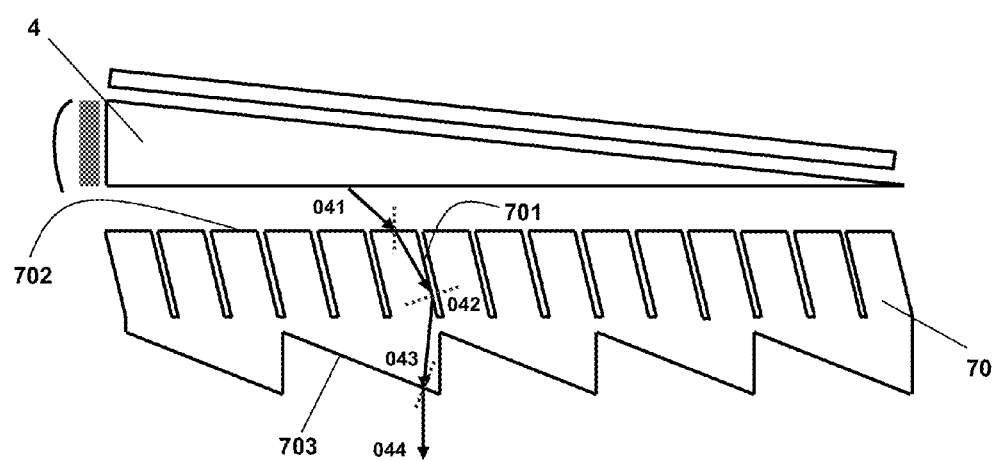
FIG. 10 is a schematic diagram of a backlight module in Example 2, where a deflection prism sheet assembly and a collimating prism sheet are integrated to generate a prism wedge.

As shown in FIG. 10, the backlight module in this example is the same as that in Example 1 except that the deflection prism sheet assembly 6 and the collimating prism sheet 7 are integrated to generate a deflection-collimating prism sheet 70. The third incident surface 71 is coincident with the third emergent surface 63.

The emergent ray 041 from the wedge sheet 4 rays on the deflection-collimating prism sheet 70 and is refracted by the second incident surface 62 to generate the light ray 042. The light ray 042 is reflected by the reflection surface 701 of the deflection-collimating prism sheet 70 to generate the light ray 043, which is refracted by the fourth emergent surface 72 of the deflection-collimating prism sheet 70 to generate the light ray 044 vertical to the second incident surface 62 of the deflection-collimating prism sheet 70.

EXAMPLE 3

Figure 12:
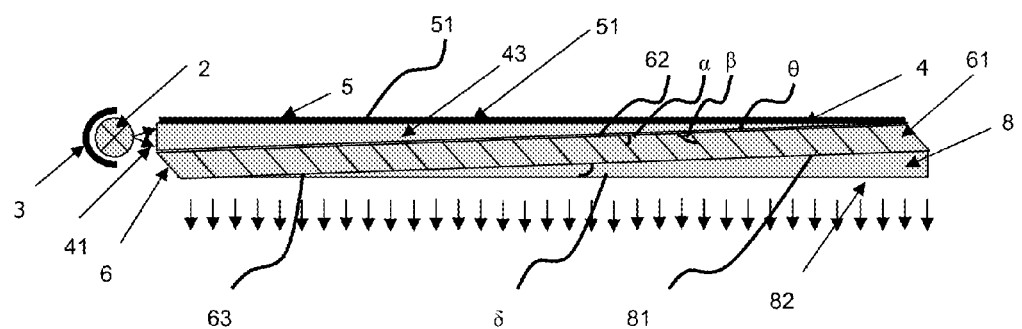
FIG. 12 is a schematic diagram of a backlight module in Example 3.

As shown in FIG. 12, the disclosure of the invention provides a backlight module for a liquid crystal display (LCD) comprising an LED light source 2, a light reflector 3, a wedge sheet 4 for generating parallel beam, a reflecting sheet 5, a deflection prism sheet assembly 6, and a collimating prism sheet 7, all of which are disposed in front of a liquid crystal display 1 in sequence. The wedge sheet 4, the reflecting sheet 5, the deflection prism sheet assembly 6, and the collimating prism sheet 7 are all made of optical materials. The wedge sheet 4 comprises a first incident surface 41, a first emergent surface 42, and a second emergent surface 43. An included angle formed between the first emergent surface 42 and the second emergent surface 43 is 3°. The first incident surface 41 is opposite to the light source 2. The reflecting sheet 5 is disposed at one side of the first emergent surface 42. The reflecting sheet 5 comprises a metal-plated reflecting surface 51. The reflecting surface 51 is parallel to the first emergent surface 42 and reflects the light rays from the first emergent surface 42 back to the wedge sheet 4. The deflection prism sheet assembly 6 comprises a plurality of parallelogram prism sheets 61 arraying in the shape of a parallelogram in one dimensional direction. The acute angle a of the parallelogram is 55°. The parallelogram prism sheets 61 comprise a second incident surface 62 and a third emergent surface 63. The second incident surface 62 is parallel to the second emergent surface 43. The acute angle a of the parallelogram at the side of the second incident surface 62 is directed to the first incident surface 41, while the obtuse angle β of the parallelogram is directed to a crosspoint of the first emergent surface 42 and the second emergent surface 43. The collimating prism sheet 8 comprises a third incident surface 81 and a fifth emergent surface 82. The third incident surface 81 is parallel to the third emergent surface 63. The fifth emergent surface 82 is parallel to the plane of the liquid crystal display 1. The included angle δ formed between the third incident surface 81 and the fifth emergent surface 82 is 3°.

EXAMPLE 4

Figure 13:
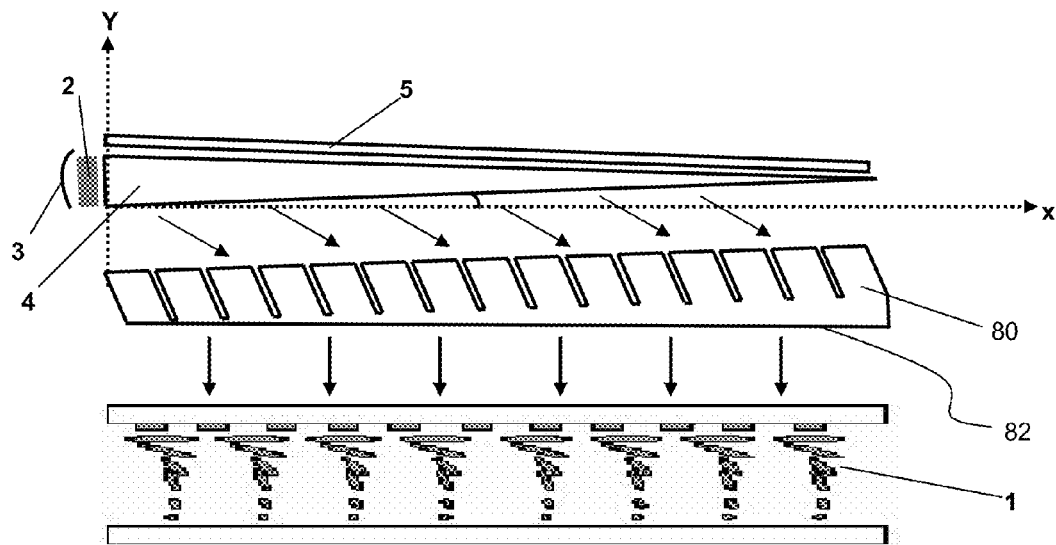
FIG. 13 is a schematic diagram of a backlight module in Example 4.

As shown in FIG. 13, the backlight module in this example is the same as that in Example 3 except that the deflection prism sheet assembly 6 and the collimating prism sheet 8 are integrated to generate a prism wedge 80. The third incident surface 81 is coincident with the third emergent surface 63.

As shown in FIG. 8, after treatment by the backlight module in FIG. 3, the emergent rays from the parallelogram prism sheets 61 have certain deflections relative to the normal line of the liquid crystal display 1. Thus, the collimating prism sheet 7 is employed to refract the emergent rays to be vertical to the liquid crystal display 1. However, upon employing the backlight modules as shown in FIGS. 12 and 13, the wedge sheet 4 can be rotated in a certain angle in advance, the second incident surface 62 is parallel to the second emergent surface 43 of the wedge sheet 4, so that the parallel beams from the fifth emergent surface 82 are vertical to the liquid crystal display 1.

The backlight modules shown in FIGS. 12 and 13 have the same structures and functions. However, in FIG. 13, the collimating prism sheet 8 is omitted, and thus the structure is much simple, thereby reducing the manufacturing difficulty and production costs.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A backlight module, comprising:
   a) a light source;
   b) a triangular wedge comprising a first incident surface, a first emergent surface, and a second emergent surface;
   c) a reflecting device; and
   d) a deflection-collimating device; the deflection-collimating device comprising a deflection prism assembly; the deflection prism assembly comprising a plurality of parallelogram prisms; each of the plurality of parallelogram prisms comprising a second incident surface, a third emergent surface, a side reflecting surface;

wherein:
   the light source, the triangular wedge, the reflecting device, and the deflection-collimating device are all disposed in sequence in front of a liquid crystal display (LCD);
   the light source is adapted to generate light rays;
   the triangular wedge is adapted to receive the light rays and transform the light rays into parallel beams;
   the deflection-collimating device is disposed between the second emergent surface and the liquid crystal display, and is adapted to refract the parallel beams to a direction vertical to a plane of the liquid crystal display;
   an included angle formed between the first emergent surface and the second emergent surface is less than or equal to 5°;
   the first incident surface is opposite to the light source;
   the reflecting device is disposed to abut against the first emergent surface to reflect the light rays from the first emergent surface back to the triangular wedge;
   the plurality of parallelogram prisms has approximately the same size, has approximately the same shape, and has approximately the same refractive index;
   the second incident surface is substantially parallel to the second emergent surface;
   each two adjacent parallelogram prisms of the plurality of parallelogram prisms are in contact with each other; whereby the parallel beams are incident into the deflection prism assembly from the second incident surface and are refracted to the side reflecting surface; and
   the side reflecting surface is adapted to reflect the parallel beams to the third emergent surface.

2. The backlight module of claim 1, wherein
   the deflection-collimating device further comprises a collimating prism;
   the plurality of parallelogram prisms is arrayed in the shape of a parallelogram in one dimensional direction;
   an acute angle of the parallelogram at the side of the second incident surface is directed to the first incident surface, and an obtuse angle of the parallelogram at the side of the second incident surface is directed to a crosspoint of the first emergent surface and the second emergent surface;
   the acute angle is more than or equal to 45°;
   the collimating prism comprises a third incident surface and a fourth emergent surface; the third incident surface is parallel to the third emergent surface; the fourth emergent surface comprises a plurality of sawteeth in series which are asymmetric in one dimensional direction; and
   an included angle formed between an inclined plane of the sawteeth and the third incident surface is less than or equal to 10°.

3. The backlight module of claim 2, wherein the deflection prism assembly and the collimating prism are integrated to generate a deflection-collimating prism; and the third incident surface is coincident with the third emergent surface.

4. The backlight module of claim 3, wherein
the reflecting device is a reflecting sheet made of optical material;
the reflecting sheet comprises a metal or medium-plated reflecting surface; and
the reflecting surface is parallel to the first emergent surface.

5. The backlight module of claim 3, wherein the triangular wedge is a wedge sheet made of optical materials.

6. The backlight module of claim 3, wherein the deflection-collimating prism is a deflection-collimating prism sheet made of optical material.

7. The backlight module of claim 2, wherein
the reflecting device is a reflecting sheet made of optical material;
the reflecting sheet comprises a metal or medium-plated reflecting surface; and
the reflecting surface is parallel to the first emergent surface.

8. The backlight module of claim 2, wherein the triangular wedge is a wedge sheet made of optical materials.

9. The backlight module of claim 2, wherein the parallelogram prisms are parallelogram prism sheets made of optical material, and the collimating prisms are collimating prism sheets made of optical material.

10. The backlight module of claim 1, wherein
the deflection-collimating device further comprises a collimating prism;
the plurality of parallelogram prisms is arrayed in the shape of a parallelogram in one dimensional direction;
an acute angle of the parallelogram at the side of the second incident surface is directed to the first incident surface, and an obtuse angle of the parallelogram at the side of the second incident surface is directed to a crosspoint of the first emergent surface and the second emergent surface;
the acute angle is more than or equal to 45°;
the collimating prism comprises a third incident surface and a fifth emergent surface; the third incident surface is parallel to the third emergent surface; the fifth emergent surface is parallel to the plane of the liquid crystal display; and
an included angle formed between the third incident surface and the fifth emergent surface is less than or equal to 10°.

11. The backlight module of claim 10, wherein the deflection prism assembly and the collimating prism are integrated to generate a prism wedge; and the third incident surface is coincident with the third emergent surface.

12. The backlight module of claim 11, wherein the reflecting device is a reflecting sheet made of optical material; the reflecting sheet comprises a metal or medium-plated reflecting surface; and the reflecting surface is parallel to the first emergent surface.

13. The backlight module of claim 11, wherein the triangular wedge is a wedge sheet made of optical materials.

14. The backlight module of claim 11, wherein the prism wedge is a prism wedge sheet made of optical material.

15. The backlight module of claim 10, wherein
the reflecting device is a reflecting sheet made of optical material;
the reflecting sheet comprises a metal or medium-plated reflecting surface; and
the reflecting surface is parallel to the first emergent surface.

16. The backlight module of claim 10, wherein the triangular wedge is a wedge sheet made of optical materials.

17. The backlight module of claim 10, wherein the parallelogram prisms are parallelogram prism sheets made of optical material, and the collimating prisms are collimating prism sheets made of optical material.

18. The backlight module of claim 1, wherein
the reflecting device is a reflecting sheet made of optical material;
the reflecting sheet comprises a metal or medium-plated reflecting surface; and
the reflecting surface is parallel to the first emergent surface.

19. The backlight module of claim 1, wherein the triangular wedge is a wedge sheet made of optical materials.

* * * * *